US008078841B2

(12) United States Patent
Ehrman et al.

(10) Patent No.: US 8,078,841 B2
(45) Date of Patent: Dec. 13, 2011

(54) PARSING-ENHANCEMENT FACILITY USING A TRANSLATE-AND-TEST INSTRUCTION

(75) Inventors: John R. Ehrman, Sunnyvale, CA (US); Dan F. Greiner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/417,943

(22) Filed: Apr. 3, 2009

(65) Prior Publication Data
US 2009/0193237 A1  Jul. 30, 2009

Related U.S. Application Data

(63) Continuation of application No. 11/077,352, filed on Mar. 10, 2005, now Pat. No. 7,516,304.

(51) Int. Cl.
*G06F 9/30* (2006.01)
*G06F 9/40* (2006.01)
*G06F 15/00* (2006.01)

(52) U.S. Cl. ..................................... 712/208
(58) Field of Classification Search .................. None
See application file for complete search history.

(56) References Cited

U.S. PATENT DOCUMENTS

| | | | |
|---|---|---|---|
| 4,575,795 A | 3/1986 | Boothroyd et al. | |
| 5,517,670 A | 5/1996 | Allen et al. | |
| 6,058,470 A | 5/2000 | Webb et al. | |
| 6,385,769 B1 | 5/2002 | Lewallen | |
| 6,442,675 B1 | 8/2002 | Derrick et al. | |
| 6,615,340 B1 * | 9/2003 | Wilmot, II | 712/209 |
| 6,633,970 B1 * | 10/2003 | Clift et al. | 712/217 |
| 6,681,322 B1 * | 1/2004 | Safford et al. | 712/244 |
| 6,735,688 B1 * | 5/2004 | Upton et al. | 712/218 |
| 7,062,639 B2 * | 6/2006 | Grochowski et al. | 712/226 |
| 7,516,304 B2 | 4/2009 | Ehrman et al. | |
| 2003/0074187 A1 | 4/2003 | Ait-Mokhtar et al. | |

FOREIGN PATENT DOCUMENTS

JP  01084365 A  3/1989

OTHER PUBLICATIONS

I. Kim and K. Choe, "Error Repair with Validation in LR-based Parsing," Korea Advanced Institute of Science and Technology, ACM Transactions on Programming Languages and Systems, vol. 23, No. 4, Jul. 2001, pp. 451-471.

D. Parson, "Using Java Reflection to Automate Extension Language Parsing," Bell Laboratories, Lucent Technologies, pp. 67-80, 2000.

(Continued)

*Primary Examiner* — Corey Faherty
(74) *Attorney, Agent, or Firm* — Steven Chiu, Esq.; Blanche E. Schiller, Esq.; Heslin Rothenberg Farley & Mesiti P.C.

(57) ABSTRACT

An instruction for parsing a buffer to be utilized within a data processing system including: an operation code field, the operation code field identifies the instruction; a control field, the control field controls operation of the instruction; and one or more general register, wherein a first general register stores an argument address, a second general register stores a function code, a third general register stores length of an argument-character buffer, and the fourth of which contains the address of the function-code data structure.

22 Claims, 3 Drawing Sheets

OTHER PUBLICATIONS

J.C. Moure, D. Rexachs, and Em Luque, "The KScalar Simulator," Universidad Autonoma de Barcelona, ACM Journal of Educational Resources in Computing, vol. 2, No. 1, pp. 73-116, Mar. 2002.

z/Architecture—Principles of Operation, 2003, IBM, 1.3.0; sections 7.5-134-7.4-135.

Thinkage, Ltd.; TRTEST—translate and test characters; 1996; http://www.thinkage,ca/English/gcos/expl/b/lib/trtest.html.

Intel 64 and IA-32 Architectures Software Developer's Manual, vol. 2A: Instruction Set Reference, A-M, 1997, Intel, vol. 2, p. 134.

Intel 64 and IA-32 Architectures Software Developer's Manual, vol. 2B: Instruction Set Reference, N-Z, 1997, Intel; vol. 2, p. 249-251.

Intel Architecture Software Developer's Manual, vol. 1: Basic Architecture, 1997, Intel, vol. 1, pp. 34-36.

z/Architecture: Principles of Operation, SA22-7832-01, Second Edition, Oct. 2001, pp. 7-153-7-158.

z/Architecture: Principles of Operation, SA22-7832-03, Fourth Edition, May 2004, pp. 7-193-7-195.

IBM Enterprise Systems Architecture/390, SA22-7201-02, Third Edition, Dec. 1994.

Office Action for U.S. Appl. No. 11/077,352 (U.S. Patent No. 7,516,304) dated Dec. 18, 2006.

Final Office Action for U.S. Appl. No. 11/077,352 (U.S. Patent No. 7,516,304) dated Apr. 12, 2007.

Office Action for U.S. Appl. No. 11/077,352 (U.S. Patent No. 7,516,304) dated Sep. 25, 2007.

Final Office Action U.S. Appl. No. 11/077,352 (U.S. Patent No. 7,516,304) dated Jul. 18, 2008.

* cited by examiner

US 8,078,841 B2

PARSING-ENHANCEMENT FACILITY USING A TRANSLATE-AND-TEST INSTRUCTION

CROSS-REFERENCE TO RELATED APPLICATIONS

This application is a continuation of co-pending U.S. patent application Ser. No. 11/077,352, filed Mar. 10, 2005, entitled "PARSING-ENHANCEMENT FACILITY," the entirety of which is hereby incorporated herein by reference.

BACKGROUND OF THE INVENTION

Instruction sets used in computer systems employing so-called Complex Instruction Set Computing (CISC) architecture include both simple instructions (e.g. LOAD, or ADD) and complex instructions (e.g. PROGRAM CALL, or LOAD ADDRESS SPACE PARAMETERS). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase system performance. Conventionally, the complex functions are implemented in microcode because building hardware execution units to execute them is expensive and error prone.

The TRANSLATE AND TEST (TRT) instruction was introduced in the original IBM System/360 architecture in 1964 and is well known in the art as described in detail in "z/Architecture Principles of Operation" (Publication Number IBM publication SA22-7832-03, available from IBM Corporation, Armonk, N.Y.), which is incorporated herein by reference in its entirety. The TRANSLATE AND TEST instruction is particularly useful in syntactically parsing a buffer, scanning left to right for specific tokens or delimiting characters. The TRANSLATE AND TEST REVERSE (TRTR) instruction is similar to TRANSLATE AND TEST, except that processing of the one-byte argument characters is done in a right-to-left manner rather than left-to-right.

The TRANSLATE AND TEST instruction shown in FIG. 1 uses a table of 256 bytes to scan a string of bytes. Each string byte is used as an index into a table, and the selected table byte is fetched. For the TRANSLATE AND TEST instruction, the selected bytes are tested, and the first non-zero table byte selected is returned to the program in a general register along with the address of the string byte which selected it; the instruction also sets the condition code, and does not update storage.

FIG. 1. depicts the format of the TRANSLATE AND TEST instruction. The bytes of the first operand are used as eight-bit arguments to select function bytes from a list designated by the second-operand address. The first nonzero function byte is inserted in a second general register, and the related argument address in a first general register. The L field specifies the length of only the first operand. The bytes of the first operand are selected one by one for translation, proceeding left to right. The first operand remains unchanged in storage.

Calculation of the address of the function byte is performed as in the TRANSLATE instruction. The function byte retrieved from the list is inspected for a value of zero. When the function byte is zero, the operation proceeds with the next byte of the first operand. When the first-operand field is exhausted before a nonzero function byte is encountered, the operation is completed by setting condition code 0. The contents of the first and second general registers remain unchanged.

When the function byte is nonzero, the operation is completed by inserting the function byte in second general register and the related argument address in first general register. The address points to the argument byte last processed. The function byte replaces bits 56-63 of second general register, and bits 0-55 of this register remain unchanged. In the 24-bit addressing mode, the address replaces bits 40-63 of first general register, and bits 0-39 of this register remain unchanged. In the 31-bit addressing mode, the address replaces bits 33-63 of first general register, bit 32 of this register is set to zero, and bits 0-31 of the register remain unchanged. In the 64-bit addressing mode, the address replaces bits 0-63 of first general register. When the function byte is nonzero, either condition code 1 or 2 is set, depending on whether the argument byte is the rightmost byte of the first operand.

Condition code 1 is set if one or more argument bytes remain to be translated. Condition code 2 is set if no more argument bytes remain. The contents of access first general register always remain unchanged. Access exceptions are recognized only for those bytes in the second operand that are actually required. Access exceptions are not recognized for those bytes in the first operand that are to the right of the first byte for which a nonzero function byte is obtained. This results in the following Condition codes: 0 if all function bytes zero; 1 if nonzero function byte and first-operand field is not exhausted; and 2 if nonzero function byte and the first-operand field is exhausted.

Currently, the TRANSLATE AND TEST instruction and the TRANSLATE AND TEST REVERSE instruction have limitations. One important limitation is that the TRANSLATE AND TEST and TRANSLATE AND TEST REVERSE instructions are only capable of scanning 8-bit characters. The text characters used in early data-processing systems were limited to 8-bit (or fewer) encoding such as ASCII or EBCDIC; the characters used in modern systems must accommodate a broader scope. For example, the Unicode standard uses a 16-bit encoding for characters. However, the TRANSLATE AND TEST instruction and the TRANSLATE AND TEST REVERSE instruction are only capable of scanning 8-bit characters, which requires complex coding to accommodate Unicode processing. Another limitation of the TRANSLATE AND TEST instruction and the TRANSLATE AND TEST REVERSE instruction is that the length of the buffer to be scanned by the instructions is hard-coded in the 8-bit L field of the instruction text. If the instruction is the target of an EXECUTE instruction, the length can be supplied in a register, but this requires more complicated programming, and the EXECUTE instruction slows the processing. A further limitation of the TRANSLATE AND TEST instruction and the TRANSLATE AND TEST REVERSE instruction is that they return only an 8-bit function code. Although the 8-bit function code is sufficient for most programs, it may be a limit in future designs of finite-state processes.

SUMMARY OF THE INVENTION

The shortcomings of the prior art are overcome and additional advantages are provided through the provision of a computer program product for executing an extended translate and test instruction. The computer program product includes a storage medium readable by a processing circuit and storing instructions for execution by the processing circuit for performing a method. The method includes, for instance, obtaining for execution the extended translate and test instruction, the extended translate and test instruction including an opcode field identifying the instruction, a bit significant field for controlling execution of the instruction, a first register field for identifying a first register used to provide the location of an argument character to be translated and a second register field for identifying a second register for saving a nonzero function code obtained from a function code data structure, the bit significant field including a first bit, a second bit, and a third bit; executing the obtained extended translate and test instruction, the executing including decoding the bit significant field wherein the first bit determines the size of the argument characters to be translated, the second bit determines the size of the function codes in the function code data structure, and the third bit determines, when argument characters have a value greater than 255, whether or not the argument character to be translated is used to select function codes from the function code data structure; based on the first register identified by the first register field, obtaining an argument character to be translated, the argument character having a size determined by the first bit; i. based on the first bit and the third bit either using a predefined value for a function code for the argument character to be translated or using the argument character to be translated as an index into the function code data structure to locate a function code corresponding to the argument character, and the function code having a size determined by the second bit; and ii. in response to the function code being nonzero, storing the nonzero function code in the second register; or iii. in response to the function code being zero, obtaining a next argument character to be translated and repeating steps i through iii, unless an ending condition exists.

In a further embodiment of the present invention, a computer program product for executing an extended translate and test instruction is provided. The computer program product includes a storage medium readable by a processing circuit and storing instructions for execution by the processing circuit for performing a method. The method includes, for instance, obtaining for execution an extended translate and test instruction, the extended translate and test instruction including an opcode field identifying the instruction, a bit significant field for controlling execution of the instruction, a first register field for identifying a first register used to provide the location of an argument character to be translated and a second register field for identifying a second register for saving a nonzero function code obtained from a function code data structure, the bit significant field including a first bit, a second bit, and a third bit; executing the obtained extended translate and test instruction, the executing including decoding the bit significant field wherein the first bit determines the size of the argument characters to be translated, the second bit determines the size of the function codes in the function code data structure, and the third bit determines whether argument characters with a value greater than 255 are used to select function codes from the function code data structure; based on the first register identified by the first register field, obtaining an argument character to be translated, said argument character having a size determined by the first bit; i. based on the first bit and the third bit either using a predefined value for a function code for the argument character to be translated or using the argument character to be translated as an index into the function code data structure to locate a function code corresponding to the argument character, and the function code having a size determined by the second bit; and ii. in response to the function code being nonzero, storing the nonzero function code in the second register, and processing of the extended translate and test instruction is terminated, and wherein the storing of the nonzero function code in the second register does not replace a character of an operand including the argument characters to be scanned; or iii. in response to the function code being zero, obtaining a next argument character to be translated and repeating steps i through iii, unless an ending condition exists.

In yet a further embodiment of the present invention, a computer program product for executing an extended translate and test instruction is provided. The computer program product includes a storage medium readable by a processing circuit and storing instructions for execution by the processing circuit for performing a method. The method includes, for instance, obtaining for execution an extended translate and test instruction, the extended translate and test instruction including an opcode field identifying the instruction, a bit significant field for controlling execution of the instruction, a first register field for identifying a first register used to provide the location of an argument character to be translated and a second register field for identifying a second register for saving a nonzero function code obtained from a function code data structure, the bit significant field including a first bit, a second bit, and a third bit; executing the obtained extended translate and test instruction, the executing including decoding the bit significant field wherein the first bit determines the size of the argument characters to be translated, the second bit determines the size of the function codes in the function code data structure, and the third bit determines whether argument characters with a value greater than 255 are used to select function codes from the function code data structure, wherein in response to the third bit indicating that argument characters with a value greater than 255 are not to be used to select function codes from the function code data structure, then in response to having an argument character with a value greater than 255 to be translated, the function code data structure is not accessed, and instead, a value of the function code is assumed to be a value of zero; based on the first register identified by the first register field, obtaining an argument character to be translated, the argument character having a size determined by the first bit; i. based on the first bit and the third bit either using zero for the function code for the argument character to be translated or using the argument character to be translated as an index into the function code data structure to locate a function code corresponding to the argument character, and the function code having a size determined by the second bit; and ii. in response to the function code being nonzero, storing the nonzero function code in the second register; or iii. in response to the function code being zero, obtaining a next argument character to be translated and repeating steps i through iii, unless an ending condition exists.

Systems and methods relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
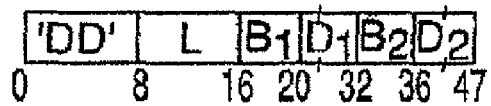
FIG. 1 is a block diagram of a traditional TRANSLATE AND TEST instruction.
Figure 2:
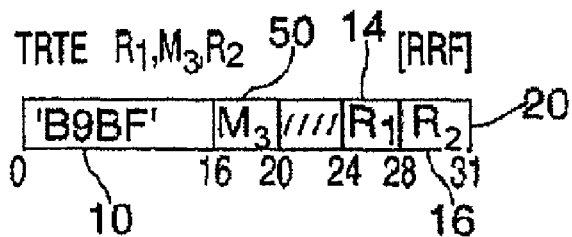
FIG. 2 is a block diagram of an exemplary embodiment of a TRANSLATE AND TEST EXTENDED instruction.
Figure 3:
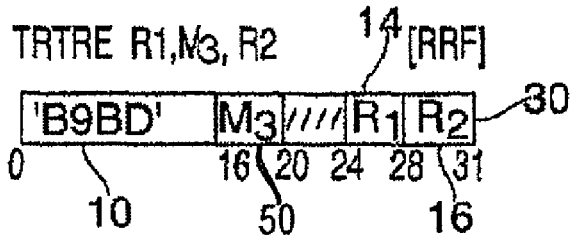
FIG. 3 is a block diagram of an exemplary embodiment of a TRANSLATE AND TEST REVERSED EXTENDED instruction.

FIG. 2. and FIG. 3 depict exemplary embodiments of the TRANSLATE AND TEST EXTENDED instruction 20 and the TRANSLATE AND TEST REVERSED EXTENDED instruction 30, respectively. The TRANSLATE AND TEST EXTENDED instruction 20 extends the capability of the TRANSLATE AND TEST instruction and the TRANSLATE AND TEST REVERSED EXTENDED instruction 30 extends the capability of the TRANSLATE AND TEST REVERSE instruction. The TRANSLATE AND TEST EXTENDED instruction 20 and TRANSLATE AND TEST REVERSED EXTENDED instruction 30 are similar to their respective non-extended versions, but include several improvements. Both the TRANSLATE AND TEST EXTENDED instruction 20 and the TRANSLATE AND TEST REVERSED EXTENDED instruction 30 include: an operation code field 10, the operation code field 10 identifies the instruction; a control field 50, the control field 50 controls operation of the instruction; and one or more general registers, wherein a first general register 14 stores an argument address, a second general register 16 stores a function code, a third general register 18 stores length of an argument-character buffer, and a fourth general register 12 contains the address of a function-code table.

One of the improvements in the TRANSLATE AND TEST EXTENDED instruction 20 and TRANSLATE AND TEST REVERSED EXTENDED instruction 30 is that the first operand consists of argument characters that may be either one or two bytes in length. Similarly, the function codes in the function-code table may be either one or two bytes in length. The function-code table is analogous to the translation table used by TRANSLATE AND TEST instruction and TRANSLATE AND TEST REVERSE instruction. Another improvement in the TRANSLATE AND TEST EXTENDED instruction 20 and TRANSLATE AND TEST REVERSED EXTENDED instruction 30 is that the size of the argument-character buffer is specified in a register, allowing for a significantly larger buffer to be scanned by a single execution of the instruction and simplifying code design. Additionally, when two-byte argument characters are being scanned, a 256-entry function-code table may be used facilitating scanning of most Unicode strings where the syntactic delimiter characters of interest, such as typical ASCII or EBCDIC delimiters, fall within the first 256 entries, thus saving function-code table space.

Figure 4:
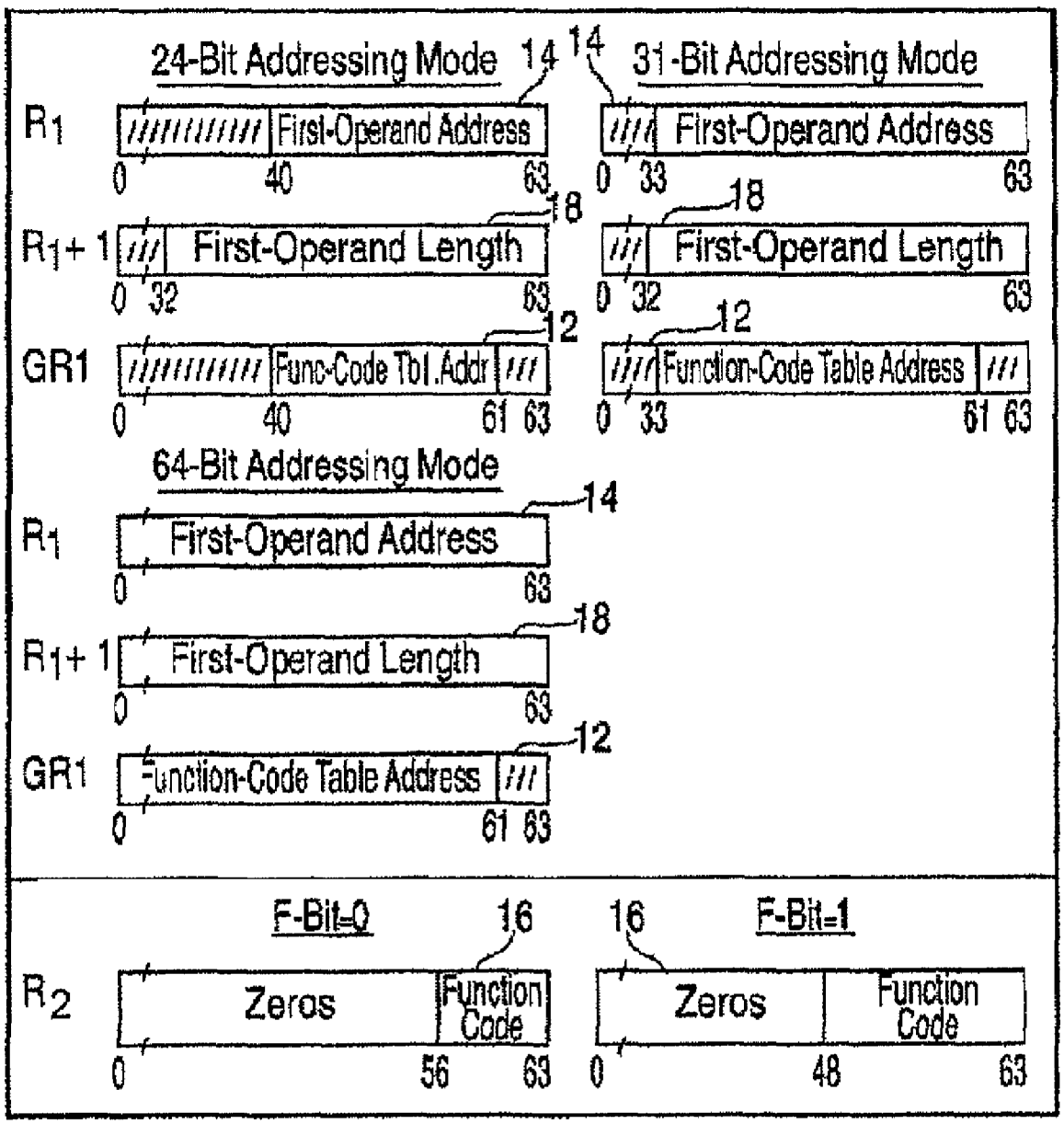
FIG. 4 is a block diagram depicting the register contents for the TRANSLATE AND TEST EXTENDED and TRANSLATE AND TEST REVERSED EXTENDED instructions shown in FIGS. 2 and 3, respectively.

Turning now to FIG. 4, the argument characters of the first operand are used to select function codes from a function-code table designated by a fourth general register 12. For TRANSLATE AND TEST EXTENDED instruction 20, the argument characters are processed in a left-to-right direction; for TRANSLATE AND TEST REVERSED EXTENDED instruction 30, the argument characters are processed in a right-to-left direction. When a nonzero function code is selected, it is inserted in a second general register 16, the related argument address is placed in the first general register 14, and the first-operand length in a third general register 18 is decremented by the number of bytes processed. The operation proceeds until a nonzero function code is encountered, the end of the first operand is reached, or a CPU-determined number of characters have been processed, whichever occurs first and the result is indicated in the condition code. The first general register 14 designates an even-odd pair of general registers and must designate an even-numbered register; otherwise, a specification exception is recognized. The third general register 18 contains the length of the first operand in bytes.

Figure 5:
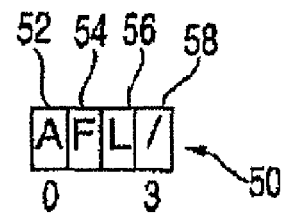
FIG. 5 is a block diagram of an exemplary embodiment of a control field, $M_3$, utilized within the TRANSLATE AND TEST EXTENDED instruction from FIG. 2 and the TRANSLATE AND TEST REVERSED EXTENDED instruction from FIG. 3.

Both the TRANSLATE AND TEST EXTENDED instruction 20 and TRANSLATE AND TEST REVERSED EXTENDED instruction 30 include a control field $M_3$ 50 an exemplary embodiment of which is shown in FIG. 5. The control field $M_3$ 50 field includes one or more bits including, but not limited to, an Argument-Character Control bit (A) 52, a Function-Code Control bit (F) 54, and an Argument-Character Limit bit (L) 56. The Argument-Character bit 52, bit 0 of the control field $M_3$ 50, controls the size of the argument characters in the first operand. When the A bit 52 is zero, the argument characters are one byte in length. When the A bit 52 is one, the argument characters are two bytes in length. When the A bit 52 is one, the first-operand length in the third general register 18 must specify an even number of bytes; otherwise, a specification exception is recognized.

Continuing with FIG. 5, the Function-Code Control bit 54, bit 1 of the control field $M_3$ 50, controls the size of the function codes in the function-code table designated by the fourth general register 12. When the F bit 54 is zero, a function code is one byte in length. When the F bit 54 is one, a function code is two bytes in length. The Argument-Character Limit bit 56, bit 2 of the control field $M_3$ 50, controls whether argument characters with a value greater than 255 are used to select function codes. When the L bit 56 is zero, argument character values are unlimited. When the L bit 56 is one, an argument character with a value greater than 255 is not used to select a function code; rather, the function code is assumed to contain zeros. When the A bit 52 of the control field $M_3$ 50 is zero, the L bit 56 is ignored. Bit 3 58 of the control field $M_3$ 50 is unassigned and should contain a zero; otherwise, the program may not operate compatibly in the future. In an alternative embodiment, bit 3 58 could be used to control the direction of the processing, rather than having two separate instructions. The following Table summarizes the size of the function-code table based on the A 52, F 54, and L 56 bits located in the control field $M_3$ 50.

TABLE 1

| A Bit 52 | F Bit 54 | L Bit 56 | Table Size (bytes) |
|---|---|---|---|
| 0 | 0 | — | 256 |
| 0 | 1 | — | 512 |
| 1 | 0 | 0 | 65,536 |
| 1 | 1 | 0 | 131,072 |
| 1 | 0 | 1 | 256 |
| 1 | 1 | 1 | 512 |

Returning to FIG. 4, the location of the first argument character in the first operand is designated by the contents of the first general register 14. The location of the leftmost byte of the function-code table is designated by the contents of the fourth general register 12. In the 24-bit or 31-bit addressing mode, the number of bytes in the first-operand location is specified by the contents of bit positions 32-63 of the third general register 18, and those contents are treated as a 32-bit unsigned binary integer. In the 64-bit addressing mode, the number of bytes in the first-operand location is specified by the entire contents of the third general register 18, and those contents are treated as a 64-bit unsigned binary integer.

The handling of the argument-character address in the first general register 14 is dependent on the addressing mode. In the 24-bit addressing mode, the contents of bit positions 40-63 of the register constitute the address, and the contents of bit positions 0-39 are ignored. In the 31-bit addressing mode, the contents of bit positions 33-63 of the register constitute the address, and the contents of bit positions 0-32 are ignored. In the 64-bit addressing mode, the contents of bit positions 0-63 constitute the address.

Continuing with FIG. 4, the function-code table is treated as being on a doubleword boundary. The handling of the function-code-table address in the fourth general register 12 is dependent on the addressing mode. In the 24-bit addressing mode, the contents of bit positions 40-60 of the fourth general register 12 constitute the address, and the contents of bit positions 0-39 are ignored. In the 31-bit addressing mode, the contents of bit positions 33-60 of the fourth general register 12 constitute the address, and the contents of bit positions 0-32 are ignored. In the 64-bit addressing mode, the contents of bit positions 0-60 of the fourth general register 12 constitute the address. In all addressing modes, the contents of bit positions 61-63 are assumed to be zeros. When a nonzero function code is selected, it is inserted into either bits 56-63 or bits 48-63 of the second general register 16, depending on whether the F bit 54 of the control field $M_3$ 50 is zero or one, respectively. The remainder of the second general register 16 is set to zeros.

In an exemplary embodiment, the argument characters of the first operand are selected one by one for processing, proceeding in a left-to-right direction for TRANSLATE AND TEST EXTENDED instruction 20, or in a right-to-left direction for TRANSLATE AND TEST REVERSED EXTENDED instruction 30. Depending on the A bit 52 of the control field $M_3$ 50, the argument characters are treated as either eight-bit or sixteen-bit unsigned binary integers, extended with zeros on the left. When the F bit 54 of control field $M_3$ 50 is zero, the argument character is added to the function-code-table address in the fourth general register 12 to form the address of the selected 8-bit function code. When the F bit 54 is one, the argument character, extended on the right with a binary 0, is added to the function-code-table address in the fourth general register 12 to form the address of the selected 16-bit function code.

When both the A bit 52 and the L bit 56 of the control field $M_3$ 50 are one, and the value of the argument character is greater than 255, then the function-code table is not accessed. The function code is assumed to contain zero in this case. When the selected function code contains zero, or when the function code is assumed to contain zero, processing continues with the next argument character in the first operand. The operation proceeds until a nonzero function code is selected, the first-operand location is exhausted, or a CPU-determined number of first-operand bytes have been processed. When the first-operand location is exhausted without having selected a nonzero function code, the first general register 14 is either incremented or decremented by the first operand length in the third general register 18; the third general register 18 is set to zero; and condition code 0 is set. For TRANSLATE AND TEST EXTENDED instruction 20, the first general register 14 is incremented by the first operand length; For TRANSLATE AND TEST REVERSED EXTENDED instruction 30, the first general register 14 is decremented by the first operand length.

When a nonzero function code is selected, the function code replaces bits 56-63 or bits 48-63 of the second general register 16, depending on whether the F bit 54 is zero or one, respectively. The address of the argument character used to select the nonzero function code is placed in the first general register 14. The third general register 18 is decremented by the number of first-operand bytes processed prior to selecting the nonzero function byte; and the condition code is set to 1.

In an exemplary embodiment, when a CPU-determined number of bytes have been processed, the first general register 14 is either incremented or decremented by the number of bytes in the first operand that were processed, the third general register 18 is decremented by this number, and condition code 3 is set. For TRANSLATE AND TEST EXTENDED instruction 20, the first general register 14 is incremented by the number of bytes processed; for TRANSLATE AND TEST REVERSED EXTENDED instruction 30, the first general register 14 is decremented by the number of bytes processed. Condition code 3 may be set even when the first-operand location is exhausted or when the next argument character to be processed selects a nonzero function byte. In these cases, condition code 0, 1, or 2 will be set when the instruction is executed again. The amount of processing that results in the setting of condition code 3 is determined by the CPU on the basis of improving system performance, and it may be a different amount each time the instruction is executed.

When the first general register 14 is updated in the 24-bit or 31-bit addressing mode, bits 32-39, in the 24-bit mode, or bit 32, in the 31-bit mode, may be set to zeros or may remain unchanged from their original values. In the 24-bit or 31-bit addressing mode, the contents of bit positions 0-31 of the first general register 14 and the third general register 18 always remain unchanged.

Access exceptions for the portion of the first operand beyond the last byte processed may or may not be recognized. For an operand longer than 4K bytes, access exceptions are not recognized for locations more than 4K bytes beyond the last byte processed. When the length of the first operand is zero, no access exceptions for the first operand are recognized. Access exceptions for any byte of the function-code table specified by the fourth general register 12 may be recognized, even if not all bytes are used. A specification exception is recognized for any of the following conditions: the first general register 14 field designates an odd-numbered register; and the A bit 52 of the control field $M_3$ 50 is one and the first operand length in the third general register 18 is odd.

Figure 6:
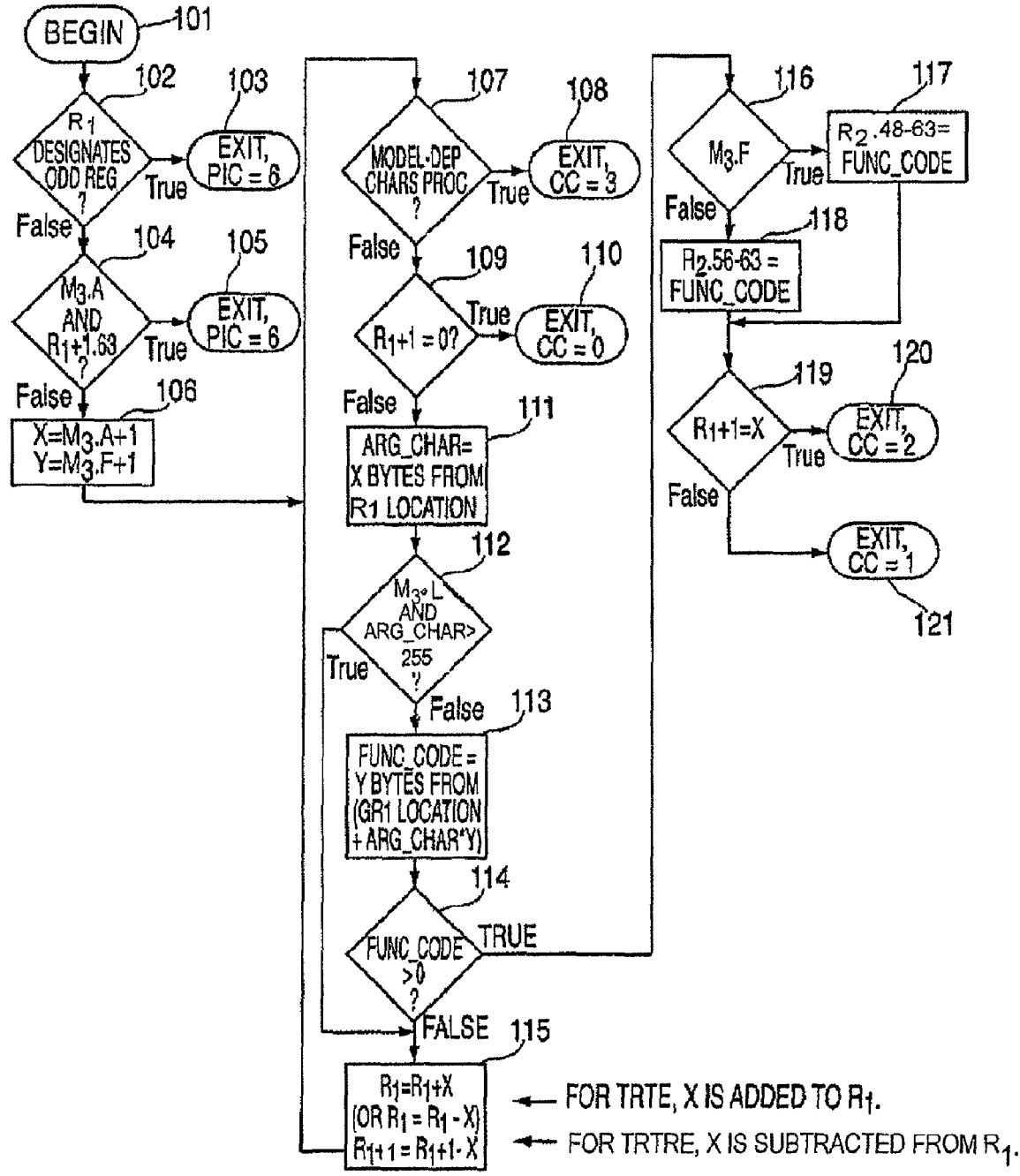
FIG. 6 is a flow chart depicting the processing of the TRANSLATE AND TEST EXTENDED instruction as depicted in FIG. 2, and the TRANSLATE AND TEST REVERSED EXTENDED instruction as depicted in FIG. 3.

Turning now to FIG. 6, a flow chart 60 depicting the processing of the TRANSLATE AND TEST EXTENDED instruction 20 is shown. The first general register 14 must designate an even/odd pair of general registers; step 102 illustrates this feature. If the first general register 14 designates an odd-numbered register, then a specification exception, program interruption code 6 (PIC 6), is recognized, as shown in step 103. Otherwise, the processing of the instruction proceeds to step 104. Next at step 104, the A bit 52 in the control field $M_3$ 50 is tested. If the A bit 52 is one, then the argument characters are two bytes in length. In which case, the argument length in the third general register 18 must designate an even number of bytes. If the A bit is one and bit 63 of the third general register 18 is one, a specification exception, program interruption code 6 (PIC 6), is recognized, as shown in step 105. Otherwise, the processing proceeds to step 106. At step 106, a temporary variable X is set to the argument-character length, that is the value of the A bit 52 in the control field $M_3$ 50 plus 1 and a temporary variable Y is set to the value of the F bit 54 in the control field $M_3$ 50 plus 1.

Steps 107 through 115 represent the main loop of the instruction implementation. Although this illustration shows the processing of one argument character at a time, a parallel-processing implementation may be able to accommodate multiple argument characters simultaneously, depending on the sophistication of the hardware. At step 107, the processor determines if a model-dependent number of characters have been processed, and if so then processing ends with condition code 3, as shown at step 108. Otherwise processing proceeds to step 109 where if the remaining length of the argument characters in the third general register 18 is zero, then all of the argument characters have been processed without finding a nonzero function-code. In this case, processing ends with condition code 0, as shown at step 110. Otherwise processing proceeds to step 111 where the next argument character is inspected; the argument-character pointer contained in the first general register 14. Next at step 112, the processor determines if the argument character is greater than 255 and the L bit 56 in the control field $M_3$ 50 is one, if so the function code is assumed to contain a zero and processing continues at step 115. Otherwise processing proceeds to step 113 where the function code is selected from the function-code table. The base address of the function-code table is in the fourth general register 12. The value of the argument character, multiplied by the size of a function code (Y) is added to the base of the function-code table in the fourth general register 12 to produce the address of the 1- or 2-byte function code. If the function code is nonzero, processing continues with step 116; otherwise, processing continues with step 115.

Continuing with FIG. 6, at step 115 for TRANSLATE AND TEST EXTENDED instruction 20, the argument-character pointer in the first general register 14 is incremented by the size of an argument character (X). For TRANSLATE AND TEST REVERSED EXTENDED instruction 30, the argument-character pointer in the first general register 14 is decremented by the size of an argument character (X). In either case, the remaining argument character length in the third general register 18 is decremented by the size of an argument character (X), and processing returns to step 107. At step 116, a nonzero function code has been selected. If the F bit 54 of the control field $M_3$ 50 is one, a two-byte function code is inserted into bits 48-63 of the second general register 16, as illustrated at step 117. Otherwise, a one-byte function code is inserted into bits 56-63 of the second general register 16, as illustrated at step 118. Processing proceeds to step 119 if the processing ended on the last argument character, if there are only Y bytes remaining in the first operand then processing ends with condition code 2, as shown at step 120. Otherwise, processing ends with condition code 1, as shown at step 121.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A computer program product for executing an extended translate and test instruction, the computer program product comprising:
   a storage medium readable by a processing circuit and storing instructions for execution by the processing circuit for performing a method comprising:
   obtaining for execution said extended translate and test instruction, said extended translate and test instruction comprising an opcode field identifying said instruction, a bit significant field for controlling execution of said instruction, a first register field for identifying a first register used to provide the location of an argument character to be translated and a second register field for identifying a second register for saving a nonzero function code obtained from a function code data structure, said bit significant field comprising a first bit, a second bit, and a third bit;
   executing said obtained extended translate and test instruction, the executing comprising:
   decoding the bit significant field wherein the first bit determines the size of the argument characters to be translated, the second bit determines the size of the function codes in said function code data structure, and the third bit determines, when argument characters have a value greater than 255, whether or not the argument character to be translated is used to select function codes from said function code data structure;
   based on the first register identified by said first register field, obtaining an argument character to be translated, said argument character having a size determined by the first bit;
   i. based on the first bit and the third bit either using a predefined value for a function code for the argument character to be translated or using the argument character to be translated as an index into said function code data structure to locate a function code corresponding to the argument character, and the function code having a size determined by the second bit; and ii. in response to said function code being nonzero, storing said nonzero function code in said second register; or iii. in response to said function code being zero, obtaining a next argument character to be translated and repeating steps i through iii, unless an ending condition exists.

2. The computer program product of claim 1, wherein the method further comprises:
storing in a register the length of an operand including said argument characters to be scanned.

3. The computer program product of claim 1, wherein said function code is one or two bytes in length.

4. The computer program product of claim 1, wherein said function code data structure may have no more than 256 entries even when each argument character being translated is two bytes.

5. The computer program product of claim 1, wherein the extended translate and test instruction can process more than single byte argument characters.

6. The computer program product of claim 1, wherein the size of an entry in said function code data structure is not limited to an 8-bit function code.

7. The computer program product of claim 1, wherein argument characters represented by a 16-bit wide character set can be translated using the same extended translate and test instruction that can be used to translate argument characters represented by an 8-bit wide character set, wherein the opcode of the extended translate and test instruction is the same for translating the 16-bit wide character set and the 8-bit wide character set.

8. The computer program product of claim 1, wherein the argument characters of the first register are processed in a left to right direction.

9. The computer program product of claim 1, wherein the argument characters of the first register are processed in a right to left direction.

10. The computer program product of claim 1, wherein the ending condition comprises no remaining argument characters to be translated or a CPU determined number of first operand bytes have been processed.

11. A computer system for executing an extended translate and test instruction, the computer system comprising:
a memory; and
a processor in communications with the memory, wherein the computer system is capable of performing a method, said method comprising:
obtaining for execution said extended translate and test instruction, said extended translate and test instruction comprising an opcode field identifying said instruction, a bit significant field for controlling execution of said instruction, a first register field for identifying a first register used to provide the location of an argument character to be translated and a second register field for identifying a second register for saving a nonzero function code obtained from a function code data structure, said bit significant field comprising a first bit, a second bit, and a third bit;
executing said obtained extended translate and test instruction, the executing comprising:
decoding the bit significant field wherein the first bit determines the size of the argument characters to be translated, the second bit determines the size of the function codes in said function code data structure, and the third bit determines, when argument characters have a value greater than 255, whether or not that argument character to be translated is used to select function codes from said function code data structure;
based on the first register identified by said first register field, obtaining an argument character to be translated, said argument character having a size determined by the first bit;
i. based on the first bit and the third bit either using a predefined value for a function code for the argument character to be translated or using the argument character to be translated as an index into said function code data structure to locate a function code corresponding to the argument character, and the function code having a size determined by the second bit; and
ii. in response to said function code being nonzero, storing said nonzero function code in said second register; or
iii. in response to said function code being zero, obtaining a next argument character to be translated and repeating steps i through iii, unless an ending condition exists.

12. The computer system of claim 11, wherein the method further comprises:
storing in a register the length of an operand including said argument characters to be scanned.

13. The computer system of claim 11, wherein said function code is one or two bytes in length, and wherein said function code data structure may have no more than 256 entries even when each argument character being translated is two bytes.

14. The computer system of claim 11, wherein the extended translate and test instruction can process more than single byte argument characters.

15. The computer system of claim 11, wherein the size of an entry in said function code data structure is not limited to an 8-bit function code.

16. The computer system of claim 11, wherein argument characters represented by a 16-bit wide character set can be translated using the same extended translate and test instruction that can be used to translate argument characters represented by an 8-bit wide character set, wherein the opcode of the extended translate and test instruction is the same for translating the 16-bit wide character set and the 8-bit wide character set.

17. The computer system of claim 11, wherein the argument characters of the first register are processed in a left to right direction or argument characters of the first register are processed in a right to left direction.

18. A method in a computer system, the method comprising:
obtaining for execution an extended translate and test instruction, said extended translate and test instruction comprising an opcode field identifying said instruction, a bit significant field for controlling execution of said instruction, a first register field for identifying a first register used to provide the location of an argument character to be translated and a second register field for identifying a second register for saving a nonzero function code obtained from a function code data structure, said bit significant field comprising a first bit, a second bit, and a third bit;
executing said obtained extended translate and test instruction, the executing comprising:
decoding the bit significant field wherein the first bit determines the size of the argument characters to be translated, the second bit determines the size of the function codes in said function code data structure, and the third bit determines, when argument characters have a value greater than 255, whether or not the argument character to be translated is used to select function codes from said function code data structure;
based on the first register identified by said first register field, obtaining an argument character to be translated, said argument character having a size determined by the first bit;
  i. based on the first bit and the third bit either using a predefined value for a function code for the argument character to be translated or using the argument character to be translated as an index into said function code data structure to locate a function code corresponding to the argument character, and the function code having a size determined by the second bit; and
  ii. in response to said function code being nonzero, storing said nonzero function code in said second register; or
  iii. in response to said function code being zero, obtaining a next argument character to be translated and repeating steps i through iii, unless an ending condition exists.

19. The method of claim 18, wherein said function code is one or two bytes in length, and wherein said function code data structure may have no more than 256 entries even when each argument character being translated is two bytes.

20. The method of claim 18, wherein argument characters represented by a 16-bit wide character set can be translated using the same extended translate and test instruction that can be used to translate argument characters represented by an 8-bit wide character set, wherein the opcode of the extended translate and test instruction is the same for translating the 16-bit wide character set and the 8-bit wide character set.

21. A computer program product for executing an extended translate and test instruction, the computer program product comprising:
  a storage medium readable by a processing circuit and storing instructions for execution by the processing circuit for performing a method comprising:
    obtaining for execution an extended translate and test instruction, said extended translate and test instruction comprising an opcode field identifying said instruction, a bit significant field for controlling execution of said instruction, a first register field for identifying a first register used to provide the location of an argument character to be translated and a second register field for identifying a second register for saving a nonzero function code obtained from a function code data structure, said bit significant field comprising a first bit, a second bit, and a third bit;
    executing said obtained extended translate and test instruction, the executing comprising:
      decoding the bit significant field wherein the first bit determines the size of the argument characters to be translated, the second bit determines the size of the function codes in said function code data structure, and the third bit determines whether argument characters with a value greater than 255 are used to select function codes from said function code data structure;
      based on the first register identified by said first register field, obtaining an argument character to be translated, said argument character having a size determined by the first bit;
      i. based on the first bit and the third bit either using a predefined value for a function code for the argument character to be translated or using the argument character to be translated as an index into said function code data structure to locate a function code corresponding to the argument character, and the function code having a size determined by the second bit; and
      ii. in response to said function code being nonzero, storing said nonzero function code in said second register, and processing of the extended translate and test instruction is terminated, and wherein the storing of the nonzero function code in the second register does not replace a character of an operand including said argument characters to be scanned; or
      iii. in response to said function code being zero, obtaining a next argument character to be translated and repeating steps i through iii, unless an ending condition exists.

22. A computer program product for executing an extended translate and test instruction, the computer program product comprising:
  a storage medium readable by a processing circuit and storing instructions for execution by the processing circuit for performing a method comprising:
    obtaining for execution an extended translate and test instruction, said extended translate and test instruction comprising an opcode field identifying said instruction, a bit significant field for controlling execution of said instruction, a first register field for identifying a first register used to provide the location of an argument character to be translated and a second register field for identifying a second register for saving a nonzero function code obtained from a function code data structure, said bit significant field comprising a first bit, a second bit, and a third bit;
    executing said obtained extended translate and test instruction, the executing comprising:
      decoding the bit significant field wherein the first bit determines the size of the argument characters to be translated, the second bit determines the size of the function codes in said function code data structure, and the third bit determines whether argument characters with a value greater than 255 are used to select function codes from said function code data structure, wherein in response to the third bit indicating that argument characters with a value greater than 255 are not to be used to select function codes from the function code data structure, then in response to having an argument character with a value greater than 255 to be translated, the function code data structure is not accessed, and instead, a value of the function code is assumed to be a value of zero;
      based on the first register identified by said first register field, obtaining an argument character to be translated, said argument character having a size determined by the first bit;
      i. based on the first bit and the third bit either using zero for the function code for the argument character to be translated or using the argument character to be translated as an index into said function code data structure to locate a function code corresponding to the argument character, and the function code having a size determined by the second bit; and
      ii. in response to said function code being nonzero, storing said nonzero function code in said second register; or iii. in response to said function code being zero, obtaining a next argument character to be translated and repeating steps i through iii, unless an ending condition exists.

* * * * *